United States Patent [19]

Abel

[11] Patent Number: 5,049,007

[45] Date of Patent: Sep. 17, 1991

[54] HORIZONTAL BELT CONVEYOR AIRLOCK

[75] Inventor: Michael J. Abel, Richmond, Va.

[73] Assignee: Philip Morris Incorporated, New York, N.Y.

[21] Appl. No.: 491,500

[22] Filed: Mar. 12, 1990

[51] Int. Cl.⁵ .............................................. B65G 53/46
[52] U.S. Cl. ...................................... 406/62; 406/52; 131/84.3; 131/109.1
[58] Field of Search ........................ 406/62, 64, 52, 65, 406/67, 77, 82, 169; 131/84.3, 109.1

[56] References Cited

U.S. PATENT DOCUMENTS

| | | | |
|---|---|---|---|
| 540,155 | 5/1895 | Dula et al. | |
| 2,643,768 | 6/1953 | Eissmann | 209/135 |
| 2,667,174 | 1/1954 | Eissmann | 131/146 |
| 2,701,570 | 2/1955 | Eissmann | 131/146 |
| 2,988,213 | 6/1961 | Davis et al. | 209/21 |
| 3,043,315 | 7/1962 | Verhappen | 131/146 |
| 3,046,998 | 7/1962 | Mortimer | 131/146 |
| 3,091,244 | 5/1963 | Molins et al. | 131/84 |
| 3,116,238 | 12/1963 | Van Etten | 209/250 |
| 3,360,125 | 12/1967 | Horsey | 209/12 |
| 3,362,414 | 1/1968 | Wochnowski | 131/146 |
| 3,367,342 | 2/1968 | Lewis | 131/145 |
| 3,409,025 | 11/1968 | Wochonowski | 131/135 |
| 3,513,858 | 5/1970 | Pietrucci | 131/146 |
| 3,514,159 | 5/1970 | Labbe | 302/59 |
| 3,608,716 | 9/1971 | Rowell et al. | 209/139 R |
| 3,655,043 | 4/1972 | Wochnowski et al. | 209/138 |
| 3,665,932 | 5/1972 | Goldbach | 131/121 R |
| 4,166,027 | 8/1979 | Smith | 209/139 R |
| 4,259,032 | 3/1981 | Kuhner | 406/62 |
| 4,264,238 | 4/1981 | Leckband et al. | 406/62 |
| 4,286,910 | 9/1981 | Conrad | 414/221 |
| 4,308,876 | 1/1982 | Rothchild | 131/293 |
| 4,446,876 | 5/1984 | Brackman | 131/110 |
| 4,850,749 | 7/1989 | Sweeney | 406/62 |

Primary Examiner—Sherman Basinger
Assistant Examiner—Carla Mattix
Attorney, Agent, or Firm—John M. Hintz

[57] ABSTRACT

An airlock for the batch or continuous feeding of a material while obstructing the free flow of a gas. The airlock comprises a continuous belt having a substantially horizontal upper surface and a plurality of nonporous flights projecting out from the belt. Each flight has a free edge located outwardly from the belt. The free edges of the flights seal against a planar sealing surface located above and parallel to the belt. Particulates are transported on the upper surface of belt below and away from any potential grinding action between the moving free edges of the flights and the stationary sealing surface. The flights, located between the sealing surface and the belt, inhibit the flow of air through the airlock.

9 Claims, 3 Drawing Sheets

HORIZONTAL BELT CONVEYOR AIRLOCK

BACKGROUND OF THE INVENTION

1. Field Of The Invention

The present invention relates to an airlock used to feed a material continuously between zones of different gas pressure while obstructing the free flow of gas. It particularly relates to such an airlock for use in delivering tobacco or other friable material.

2. Description Of The Related Art

Many manufacturing operations use differential gas pressure, generated either by suction or forced gas, to move material from one location to another. For example, in the production of tobacco products, flowing air is often used to transport and/or classify particles of tobacco. At the terminus of such a transport or classification process, it is often desired to separate the tobacco particles from the airflow. Such separation is generally accomplished today by a rotary airlock. Such an airlock typically may comprise a funnel-shaped feed inlet, a housing having therein a chamber in the shape of a horizontal cylinder with a transport wall and a return wall, a vaned rotor which coaxially rotates within the cylindrical chamber, and an outlet at the bottom of the chamber. The vaned rotor may have flexible, selvedge-tipped vane edges or hard-tipped vane edges. Examples of similar airlocks are referred to in U.S. Pat. Nos. 2,643,768; 2,667,174; 2,701,570; 2,988,213; 3,043,315; 3,046,998; 3,116,238; 3,360,125; 3,362,414; 3,409,025; 3,513,858; 3,608,716; 3,655,043; 3,665,932; 4,166,027; 4,259,032; 4,264,238; 4,308,876; and 4,446,876.

There are problems with such rotary airlocks, primarily an undesired degree of breakage of tobacco strands, and secondarily a degree of abrasive wear to the airlock itself. As each vane sweeps up from the return wall of the cylinder into the tobacco entering the rotary airlock, the vane begins a shearing action between the falling tobacco strands. This shearing action may break tobacco strands.

As the vane edge passes through the incoming tobacco, tobacco strands may become momentarily impinged on the vane edge. This may result in breakage of tobacco strands due to the fast motion of the vane edge relative to the tobacco strands. When the vane edge then rotates toward the transport wall of the airlock chamber, it creates a high-shear point which may cause further strand breakage or even possibly cause the rotor to jam. As the vane edge sweeps along the transport wall, tobacco between adjacent vanes is thrown outward toward the wall by centrifugal force. Because the vanes move from a horizontal direction to a vertical direction, gravity also causes the tobacco to tumble in the pocket between adjacent vanes toward the transport wall.

As the vane edge continues its motion, there is a grinding action between the vane edge and the transport wall which may further damage the tobacco and additionally wear both the transport wall and the vane edge, particularly when foreign matter such as sand is present. At the outlet, interaction between driven and falling tobacco may shear and break more tobacco.

Another type of valve for maintaining an airlock while transferring material by differential air pressure is an inflatable valve. An example of such an airlock is referred to in U.S. Pat. No. 4,286,910 to Conrad. An inflatable valve uses multiple inflatable elements which cooperate to transfer material between zones of the same or different pressure by peristaltic action. The main disadvantage of such a valve is its relative complexity, which limits its practical application. This is due to limited product flow rates achievable through the valve, a substantial risk of mechanical problems associated with the operation of the valve, potential loss of sealing between zones from product buildup on sealing surfaces, and product degradation from compression during sealing.

Single endless belts also have been used in airlocks. For example, U.S. Pat. No. 540,155 to Dula et al. refers to an endless belt provided with cross pieces which conducts tobacco leaves from a box and discharges them into a pneumatic conveyor. The discharge of air past the endless belt is said to be prevented on one end by a close fit between the cross pieces and a rounded end of the box and on the other end by flexible strips lapping on the cross pieces.

If used for separating tobacco, the contact between the flexible strips and the cross pieces would cause shearing of tobacco caught on the edges of the cross pieces. The contact would also cause wear of both the flexible strips and the cross pieces at the point of contact. This single belt system involves relative motion between the stationary flexible strips and the moving leaves as the leaves fall by gravity. This relative motion results in further breakage of the conveyed material.

In the Dula et al. device, sealing is intended to occur in the curved portions of the airlock. The seal is horizontal to vertical (tobacco discharge side) and vertical to horizontal (return side) similar to a rotary valve. Because of this arrangement, gravity and centrifugal force would cause the tobacco leaves to contact the flexible sealing strips. This contact would damage the tobacco.

Finally, because the seal between the flexible strips and the cross pieces is not continuous, substantial air leakage would result. The air leakage would produce further breakage of the conveyed material by moving air in the opposite direction of the discharging leaves (suction system) or by creating pockets of turbulence (positive pressure system). The airlock would rapidly jam under these conditions.

U.S. Pat. No. 3,091,244 to Molins et al. and U.S. Pat. No. 3,514,159 to Labbe refer to an endless band forming one wall of a channel. Tobacco moving through the channel forms an airlock. There is relative motion between the non-moving walls of the channel and the tobacco confined thereby. The airseals in Molins et al. and Labbe are accomplished along a portion of the belt which is not horizontal.

SUMMARY OF THE INVENTION

The present invention is an airlock that has a continuous belt supported by at least two horizontally spaced rollers and a belt support plate. The uppermost surface of the belt is suspended in a substantially horizontal fashion between the rollers. To the outside surface of the belt are attached a plurality of non-porous flight means such as a flight projecting substantially perpendicular to the outside belt surface. The belt is intended to rotate in one direction, from upstream to downstream, along its upper surface in a transport path for particulates such as tobacco.

Located above a portion of the belt is a particulate intake feed through which tobacco freely falls to the upper surface of the belt. The tobacco may be fed in either a batch or a continuous mode. Downstream of the intake and above the belt, there is a first planar sealing surface located in spaced parallel relationship with the upper surface of the belt, such that the upper edges of the flights seal against the sealing surface and substantially obstruct the flow of gas such as air through the space between the belt and the downstream sealing surface.

First and second planar side sealing surfaces, in spaced parallel relationship to each other, are located above and substantially perpendicular to the upper surface of the belt and below and substantially perpendicular to the downstream sealing surface. The side edges of the flights seal against the side sealing surfaces and substantially obstruct the flow of gas such as air.

In operation, particulates such as tobacco particles fall through the intake and land on the uppermost surface of the belt to form a pile having a height which is substantially less than the height of the flights. The rotation of the belt then transports the tobacco particles downstream. The difference in height between the tobacco particles and the flights prevents substantially all the tobacco from being caught between a free edge of a flight and the sealing surface against which such edge is being dragged.

Also, because the belt is maintained in an entirely horizontal plane during filling of the pockets and passage through the air seal, gravity and the relatively slow belt speed prevent the tobacco from tumbling within the pocket and being caught between the flight and the sealing surface. Since the airlock of the present invention does not rotate about a central axis in the area of the seal, centrifugal force does not play a role in the conveyance of tobacco particles in this area.

As the upper part of the belt rotates around its downstream roller, tobacco particles fall from the surface of the belt and from its associated flights, through a discharge opening. The endless belt then returns to the upstream roller.

In the preferred embodiment, a second planar sealing surface is located above that portion of the belt between the upstream roller and the intake, and is in spaced parallel relationship to the upper surface of the belt such that the flights substantially obstruct the flow of gas such as air through the space between the belt and the upstream sealing surface. Thus, on both the upstream and downstream sides of the intake, all air sealing is done with flights, the dragging free edge of which is substantially not in contact with tobacco because of the reasons given above in describing the horizontal seal of the present invention.

Unlike Dula et al., Molins et al., and Labbe, no sealing is accomplished while the tobacco is traveling along any portion of the belt which is not horizontal, where such tobacco would be abraded between a free edge of a flight and a sealing surface.

The present invention can have sufficient capacity to receive tobacco in free-fall without subjecting the tobacco to shearing forces such as those that are present in prior art airlocks. Thus, the present invention has the advantage of shearing and breaking less tobacco than such airlocks.

The capacity of the present invention can be increased by increasing belt speed, belt width, or height of the flights. Pressure differential isolating capacity can be increased by further adjusting the tension rollers to increase tension on the belt and by increasing the number of flights in sealing engagement with the sealing surface.

An object of the present invention is to provide an airlock in which degradation of tobacco (through interaction between moving parts, moving tobacco, and stationary housing walls) is minimized.

BRIEF DESCRIPTION OF THE DRAWINGS

The above and other objects and advantages of this invention will be apparent upon consideration of the following detailed description, taken in conjunction with the accompanying drawings, in which like reference numbers refer to like parts throughout and in which.

DESCRIPTION OF THE PREFERRED EMBODIMENT

Figure 1:
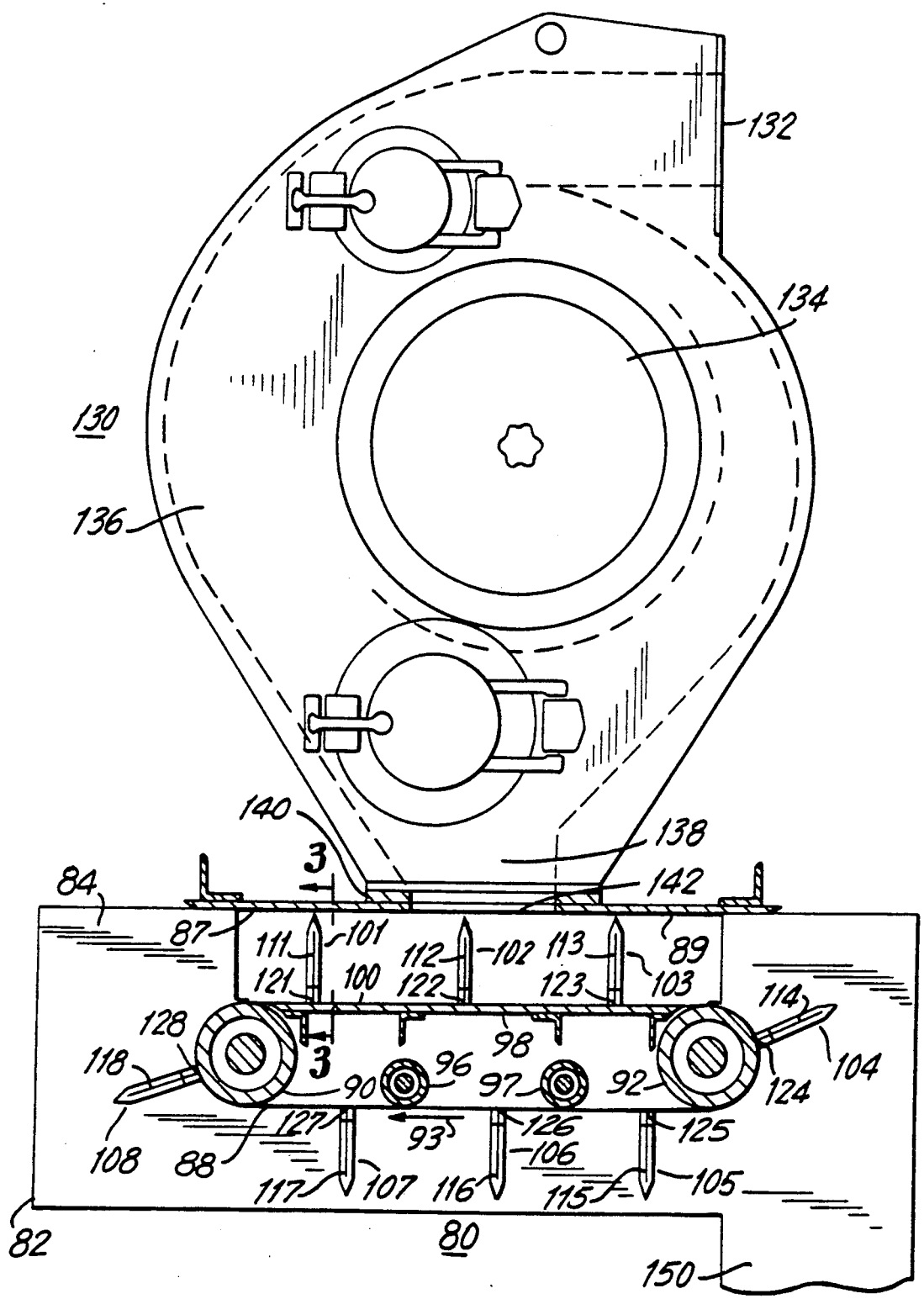
FIG. 1 is an elevation in section of the present invention as it is used with a tangential separator.
Figure 2:
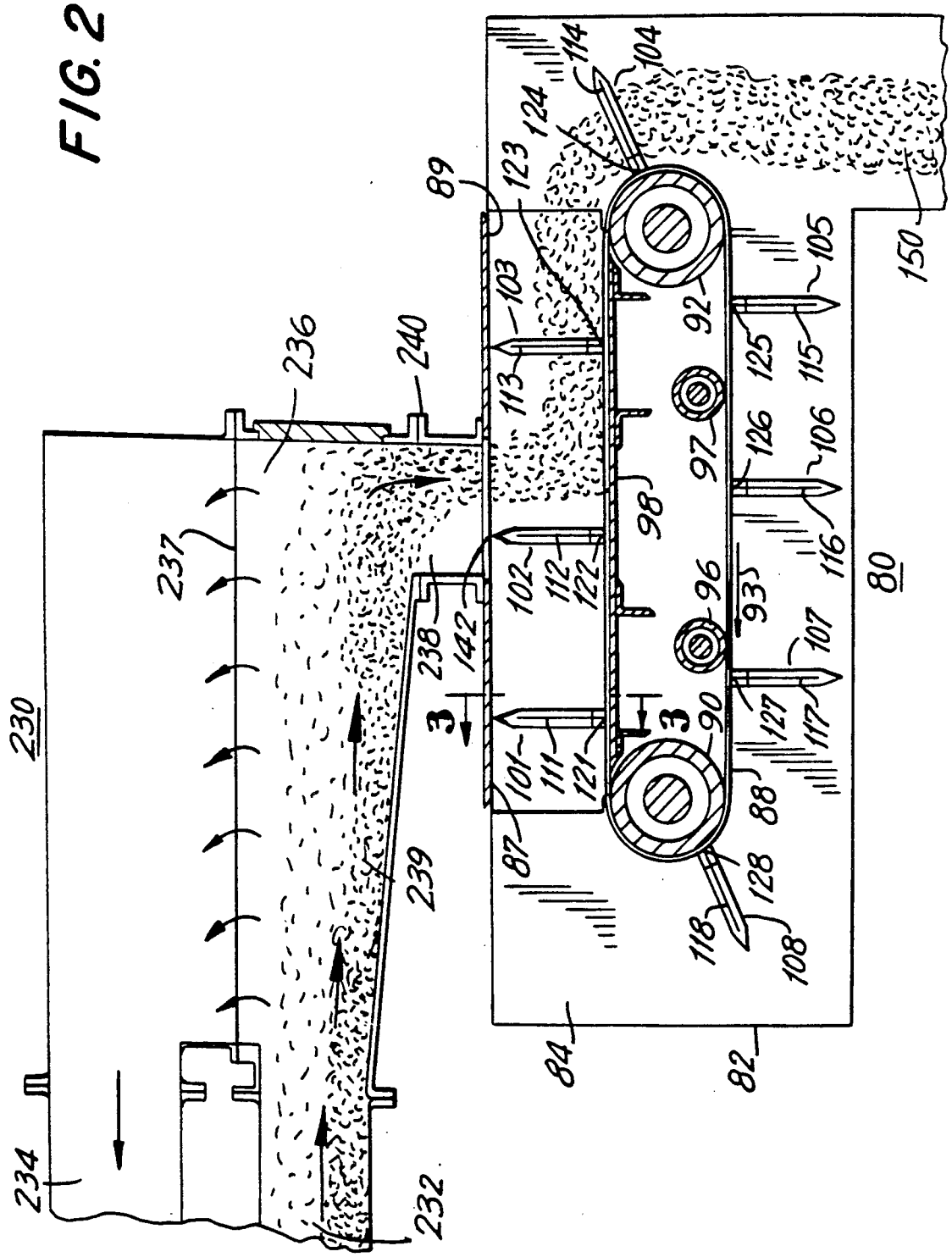
FIG. 2 is an elevation in section of the present invention as it is used with a particular cigarette maker receiver.

A preferred embodiment of the horizontal airlock, generally designated 80, of the present invention is shown in FIGS. 1 and 2. It comprises a housing 82 which contains a continuous moving belt 88 with an upper surface 100, an upstream sealing surface 87, and a downstream sealing surface 89. Upstream sealing surface 87 and downstream sealing surface 89 are located above belt 88 in spaced parallel relation ship to the upper surface 100 of belt 88.

Figure 3:
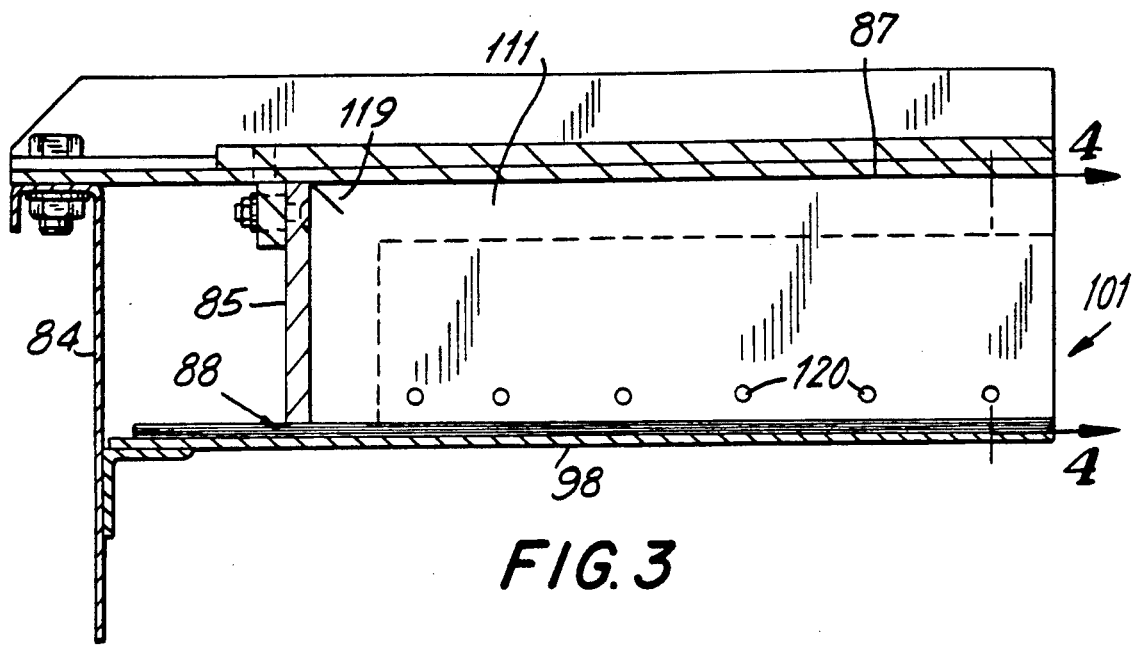
FIG. 3 is a front elevation in section of a portion of the present invention particularly illustrating the flights of the present invention.

The housing 82 also contains first and second side wall sealing surfaces 85, 86 (see FIG. 3). Side wall sealing surfaces 85, 86 are located in spaced parallel relation above and perpendicular to the upper surface 100 of belt 88 and below and perpendicular to the upstream sealing surface 87 and downstream sealing surface 89.

Belt 88 is suspended between two equal-sized horizontal rollers 90, 92. Rollers 90, 92 are mounted to side walls 84 of housing 82 and at least one of them is driven, as by a motor (not shown), in a direction 93 which would be clockwise in FIGS. 1 and 2. Tension rollers 96, 97 are also mounted to side walls 84 of housing 82 in a vertically adjustable manner so that tension can be applied to the belt by displacing tension rollers 96, 97 downward. The amount of tension applied may be any amount required to prevent lifting of the belt by upward forces (e.g., air suction).

Belt support plate 98 is also mounted to side walls 84 and supports belt 88 in its substantially horizontal plane against any downward forces. The conveyor belting is of a relatively thick material such as 7-ply selvedge to minimize belt flexibility.

Non-porous flight means, such as flights 101-108, extend in a substantially perpendicular direction from the upper surface 100 of belt 88. Flights 101-108, as presently envisioned, each comprise a pocket flight 111-118 secured to a formed cleat 121-128.

Figure 4:
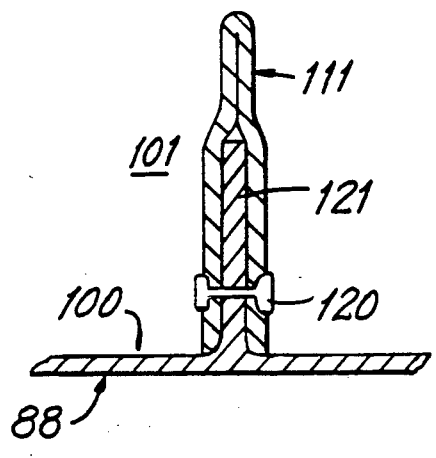
FIG. 4 is an elevation in section of the flights of the present invention.

FIG. 3 shows one such flight 101 constructed from formed cleat 121 and pocket flight 111. FIG. 4 shows flight 101 in cross-section. The construction of flights 102-108 is the same as that shown in FIGS. 3 and 4.

Formed cleat 121 is manufactured as an integral part of belt 88 so that the cleat extends in a substantially perpendicular direction from upper surface 100 across the entire width of belt 88. The number of formed cleats on the belt depends on the number of flights desired. In the preferred embodiment described herein, the number of flights, and thus the number of formed cleats, is eight. Formed cleat 121 is preferably three inches in height and twenty-two inches in width. However, the number, height, and width of the formed cleats is not limiting as it should be readily understood that the number of flights needed is a matter of design choice. A suitable belt with formed cleats is 7-ply Fabreeka Brite belting with 14-ply cleats available from Fabreeka Products Co., Inc. (Box F, 1190 Adams Street, Boston, MA).

Pocket flight 111 may be made of any suitable flexible material such as 3-ply selvedge. The flexible material may be of any desired shape, but a rectangular shape is preferred. To construct pocket flight 111, the flexible material is folded on an imaginary center line. This fold results in two inner surfaces, two outer surfaces, two free edges, and one folded edge. The folded edge of pocket flight 111 is ultimately disposed outwardly or distally from the upper surface 100 of belt 88 from which flight 101 extends.

Pocket flight 111 must be of sufficient size so that when mounted on formed cleat 121, the distal folded edge of pocket flight 111 sealingly engages upstream sealing surface 87 and downstream sealing surface 89. Similarly, the width of pocket flight 111 must be such that when mounted on formed cleat 121 the sides of pocket flight 111 sealingly engage side wall sealing surfaces 85, 86. To accomplish these ends, pocket flight 111 should extend above formed cleat 121 no more than one and one-quarter inches and no more than one and one-quarter inches beyond each side of formed cleat 121. Pocket flight 111 preferably extends one and one-eighth inches above formed cleat 121 and one and one-eighth inches beyond each side of formed cleat 121.

To construct flight 101, pocket flight 111 is placed over formed cleat 121 so that a portion of the inner surfaces contact formed cleat 121 and so that the distal folded edge of flight 111 extends above the top of formed cleat 121. Glue is applied to those portions of the inner surfaces of pocket flight 111 that will not contact formed cleat 121 so that when folded over formed cleat 121, pocket flight 111 will be adhesively bonded to itself at those areas extending above and beyond formed cleat 121.

As shown in FIG. 3, relief cut 119 is made in pocket flight 111 at an approximate forty-five degree angle from the corner of the distal folded edge. A similar relief cut, not shown in FIG. 3, would be made in the other corner of the distal folded edge of pocket flight 111. These cuts may be no more than one and one-half inches in length, with three-quarters of an inch being preferred. Pocket flight 111 is secured to formed cleat 121 at its free edges by pop rivets or countersunk bolts 120. Because of this construction, pocket flights may be manufactured in advance and may be maintained in reserve to provide for easy replacement of worn or damaged pocket flights. This is an advantage over simply using formed cleat 121 as a free edge since such an arrangement would require belt replacement when the formed cleats became worn.

In operation, airlock 80 would be used at the terminus of a pneumatic tobacco conveying system. This terminus could be of any design, but the most common would be a tangential or cyclone separator or a cigarette maker receiver. FIG. 1 shows the use of airlock 80 with a tangential separator 130. In practice, tobacco from storage silos (not shown) would be transported via a feeding device into and through a duct (not shown) by differential air pressure (suction or forced air) to an inlet 132 of tangential separator 130. The tangential separator 130 serves to separate tobacco from the airstream used to transport the tobacco. In the configuration shown in FIG. 1, transportation of the tobacco would be accomplished by creating a vacuum in the duct by use of an exhaust fan (not shown) connected to exhaust outlet 134 of tangential separator 130. This vacuum would typically be from five to twenty inches of water static pressure as measured at the tangential separator 130.

Air and tobacco first enter inlet 132 and then enter a large volume chamber 136 where the tobacco impinges against the inner surface of chamber 136. The tobacco then slides along the inner surface of chamber 136 and falls toward discharge outlet 138. The air exits via exhaust outlet 134. Discharge outlet 138 is attached by flange means 140 to intake 142 of airlock 80. In the position shown in FIG. 1, tobacco falls onto the upper surface 100 of belt 88 and forms a pile between flight 102, flight 103, and side wall sealing surfaces 85 86. This tobacco pile is substantially lower in height than flight 102 and flight 103. The tobacco pile is transported downstream on belt 88 by the continuous rotation of either roller 90 or roller 92 to which belt 88 is in contact.

During the motion of belt 88, the distal folded edge of pocket flight 101 seals against upstream sealing surface 87 and the distal folded edge of pocket flight 103 seals against downstream sealing surface 89 to prevent air from flowing through the airlock 80 and into the air separator 136. Because of the depth of the horizontal pockets, defined by the height of flights 101–108, the seal formed between pocket flight 103 and the downstream sealing surface 89 is well above the height of the tobacco pile. After further rotation of roller 92, the roller which is driven in FIG. 1, and the resulting rotation of belt 88, the tobacco falls from belt 88 through discharge 150 as belt 88 passes around roller 92. The continuous belt then returns to and around roller 90.

This description has been made with regard to only one portion of continuous belt 88. Tobacco may be fed to the airlock in either a batch or a continuous mode. In either case, the continuous belt 88 is in constant motion downstream. Thus, the previous description of operation with reference to flight 101 and flight 103 applies to each of flights 101–108 in the same manner.

As previously mentioned, the horizontal airlock of the present invention also may be used with a cigarette maker receiver. This configuration is shown in FIG. 2. In operation, tobacco 239 from storage silos (not shown) is transported via a tobacco feeder into and through a duct (not shown) to inlet 232 of receiver 230 by forced air typically at a negative pressure of five to twenty inches of water generated by a fan (not shown). Air and tobacco first enter inlet 232 and then enter an expansion chamber 236 where the tobacco 239 partly settles by gravity, and by the effect of reduced velocity upon entering expansion chamber 236, toward outlet 238 and air exits via exhaust outlet 234. Screen 237 is interposed between inlet 232 and exhaust outlet 234 and in a substantially horizontal relationship to the top and bottom of expansion chamber 236. Screen 237 prevents any particles of tobacco carried by the air from exiting expansion chamber 236 with the air through exhaust outlet 234. Outlet 238 is attached by flange means 240 to intake 142 of airlock 80. In the position shown in FIG. 2, the operation of the airlock is identical to that previously described with regard to FIG. 1.

Although a single flight might be inadequate to seal off a high pressure differential from leaking across it, a plurality of flights can provide a series of low pressure differential isolation chambers which collectively are able to isolate a pressure differential equal to the sum of the pressure capacity of all the individual chambers. In order to isolate higher differential pressures, one need only increase the tension of the belt by adjusting tension rollers 96, 97 downward and increase the number of flights in sealing engagement with the upstream and downstream sealing surfaces. The area of the belt surface is dictated by the volume and number of chambers desired to be transporting tobacco at any given moment. These, in turn, are functions of pressure differential, designed capacity, belt width, flight area, belt speed, sealing ability of each individual chamber, and possibly other factors such as cost or available space.

In the presently preferred embodiment, pressure differentials up to about twenty inches of water are accommodated, moving up to four and one-half cubic feet of material per foot of flight width—about thirteen and one-half to thirty-six pounds of tobacco per minute (per foot of flight width). The height of the flights is from about two and one-half to no more than six inches. Flight width is from about eighteen to no more than seventy-two inches. Spacing between flights and also belt length are dictated by pressure drop and by space limitations, but are presently six and one-half inches and twenty inches from roller to roller (centerline), respectively. Belt speed is from fourteen to twenty-six feet per minute. Belt width is from twenty-four to no more than seventy-eight inches.

I claim:

1. An airlock for the continuous feeding therethrough of a material, while obstructing the free flow of a gas, said airlock comprising:
   a continuous belt means, having a substantially horizontal upper surface;
   a planar sealing surface located above the belt means, a substantial part of the planar sealing surface being substantially horizontal and in spaced parallel relationship above the upper surface of the belt means;
   the belt means having a plurality of non-porous flight means projecting outwardly from said belt means;
   each flight means having a free edge disposed outwardly from the surface of the belt means and each free edge being capable of sealingly engaging the planar sealing surface.

2. An airlock for the continuous feeding therethrough of a material, while obstructing the free flow of a gas, the airlock comprising:
   a housing;
   a continuous belt means, having a substantially horizontal upper surface, located within the housing;
   the belt means having a plurality of non-porous flight means projecting outwardly from said belt means;
   each flight means having a free edge disposed outwardly from the surface of said belt means; and
   a planar sealing surface, located within the housing, a substantial part of said planar sealing surface disposed in spaced substantially parallel relationship above the horizontal upper surface of said belt means at such distance as to sealingly engage said free edges of said flight means.

3. The airlock of claim 1, wherein the planar sealing surface is stationary.

4. The airlock of claim 2, wherein the planar sealing surface is stationary.

5. The airlock of claim 2, wherein the housing has first and second side wall sealing surfaces located in spaced parallel relation above and substantially perpendicular to the continuous belt means and in spaced parallel relation below and substantially perpendicular to the planar sealing surface.

6. The airlock of claim 5, wherein the planar sealing surface is stationary.

7. The airlock of claim 5 wherein the flight means are capable of sealingly engaging the first and second side wall sealing surfaces.

8. The airlock of claim 7, wherein the planar sealing surface is stationary.

9. An apparatus for the continuous feeding therethrough of a material, said apparatus comprising:
   duct means;
   blower means for providing airflow within the duct means;
   deceleration chamber means having an inlet and an outlet;
   an airlock having an intake and a discharge;
   said inlet of the deceleration chamber means being in fluid communication with the duct means;
   said outlet of the deceleration chamber means being in fluid communication with the intake of the airlock;
   wherein the airlock contains (i) a continuous, substantially horizontal belt means, (ii) a planar sealing surface, a substantial part of said planar sealing surface being substantially horizontal to and in spaced substantially parallel relationship above the belt means, (iii) first and second side wall sealing surfaces located in spaced parallel relation above and substantially perpendicular to the continuous belt means and in spaced parallel relation below and substantially perpendicular to the planar sealing surface, and (iv) a plurality of non-porous flight means projecting outwardly from the belt means, said flight means being capable of sealingly engaging the planar sealing surface and the first and second side wall sealing surfaces.

* * * * *